(12) United States Patent
Kaschner

(10) Patent No.: US 8,307,720 B2
(45) Date of Patent: Nov. 13, 2012

(54) DEVICE FOR DETERMINING A TORQUE AND/OR A ROTATIONAL ANGLE OF A SHAFT

(75) Inventor: Axel Kaschner, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 12/817,904

(22) Filed: Jun. 17, 2010

(65) Prior Publication Data

US 2010/0326208 A1    Dec. 30, 2010

(30) Foreign Application Priority Data

Jun. 25, 2009 (DE) .......... 10 2009 027 191

(51) Int. Cl.
*G01L 3/02* (2006.01)
(52) U.S. Cl. .................................. 73/862.331
(58) Field of Classification Search .............. 73/862, 73/331, 862.337, 862.046, 862.331–862.333
See application file for complete search history.

(56) References Cited

U.S. PATENT DOCUMENTS

| | | | | |
|---|---|---|---|---|
| 4,234,139 A | * | 11/1980 | Porchia | 361/289 |
| 4,448,275 A | * | 5/1984 | Kitagawa et al. | 180/446 |
| 4,941,363 A | * | 7/1990 | Doemens et al. | 73/862.337 |
| 5,574,442 A | * | 11/1996 | Kinoshita et al. | 340/870.38 |
| 6,940,278 B2 | * | 9/2005 | Pettersson et al. | 324/207.25 |
| 7,078,915 B1 | * | 7/2006 | Lin | 324/660 |
| 2006/0144166 A1 | * | 7/2006 | Ruehl et al. | 73/862.331 |

FOREIGN PATENT DOCUMENTS

| | | |
|---|---|---|
| DE | 29 51 148 | 7/1981 |
| DE | 10 2005 025 870 | 12/2006 |

* cited by examiner

*Primary Examiner* — Max Noori
(74) *Attorney, Agent, or Firm* — Kenyon & Kenyon LLP

(57) ABSTRACT

A device for determining a torque and/or a rotational angle of a shaft, which has a circuit carrier, which is concentric to the shaft, and on which at least two current-conducting printed conductor sections are situated. The device additionally has one transducer element, which is concentric to the shaft and is rotatable in relation to the circuit carrier, having at least one first subarea made of electrically conductive material and at least one second subarea made of electrically nonconductive material. Upon application of a torque to the shaft, the transducer element rotates in relation to the circuit carrier, whereby an overlap area between the printed conductor sections and the first subarea(s) of the transducer element changes and thus a change in an inductance of the printed conductor sections occurs.

12 Claims, 3 Drawing Sheets

DEVICE FOR DETERMINING A TORQUE AND/OR A ROTATIONAL ANGLE OF A SHAFT

BACKGROUND INFORMATION

A measuring device for the contactless detection of a rotational angle and/or torque on a stationary or rotating shaft is described in German Patent No. DE 29 51 148, in which two bodies, which are concentric to the shaft and are made of electrically conductive material, are provided, one of which is connected rotationally fixed to the shaft and the other of which is rotatable in relation thereto. A coil which is concentric to the shaft is situated in direct proximity to the two bodies and the bodies contain cutouts whose shared overlap area changes with increasing rotation angle occurring between the two bodies. In this measuring device, the fact is made use of that an alternating magnetic field originating from the coil generates stronger eddy currents in the two bodies the less the body adjacent to the coil is capable of shielding the second body in partial areas or in its entirety.

Measuring devices or sensor systems of this type, which are based on the generation of eddy currents, are frequently also designated as eddy current sensors.

A further eddy current sensor system is also described, for example, in German Patent Application No. DE 10 2005 025 870.

SUMMARY OF THE INVENTION

The present invention provides a device for determining a torque and/or a rotational angle of a shaft, which has a circuit carrier concentric to the shaft, on which at least two current-conducting printed conductor sections are situated. The device additionally has one transducer element, which is concentric to the shaft and is rotatable relative to the circuit carrier, having at least one first subarea made of electrically conductive material and having at least one second subarea made of electrically non-conductive material. Upon application of a torque to the shaft, the transducer element rotates in relation to the circuit carrier, whereby an overlap area between the printed conductor sections and the first subarea(s) of the transducer element changes and a change in the inductance of the printed conductor sections thus occurs.

In contrast to known sensor systems or measuring devices, the device according to the present invention having the circuit carrier and the transducer element has only two components, which results in a significant cost reduction. The fact that no further sensor elements are necessary in addition to the printed conductor sections situated on the circuit carrier and the transducer element also contributes to minimizing the cost expenditure. The device according to the present invention has a low sensitivity in relation to adjustment tolerances, so that even slight tilting of the circuit carrier in relation to the transducer element or a slight change in the spacing of the two elements from one another still results in reliable measuring results. In addition, the device according to the present invention requires only very little installation space, which represents a decisive advantage in many applications.

According to one specific embodiment of the present invention, the transducer element made of electrically conductive base material and the second subareas made of electrically nonconductive material are formed by openings, which are preferably implemented in the form of circular sectors or circular segments and are distributed uniformly over the transducer element in the peripheral direction of the shaft.

According to an alternative specific embodiment of the present invention, the transducer element may also be made of electrically nonconductive base material, in this case, the first subareas made of electrically conductive material being formed by metal surfaces, which are preferably implemented in the form of circular sectors or circular segments and are distributed uniformly over the transducer element in the peripheral direction of the shaft. The metal surfaces are preferably implemented as injection-molding-encapsulated metal inlay parts.

The printed conductor sections situated on the circuit carrier, which act as antennas, may be implemented by printed conductors arranged on the circuit carrier in spirals, which are preferably distributed uniformly over the circuit carrier in the peripheral direction of the shaft.

It is advantageous for the function of the device according to the present invention if the magnetic field generated by the printed conductor sections is oriented so it is focused on the transducer element as much as possible. This focusing is achieved by printed conductors arranged in spirals, but may also be achieved by other planar configurations of the printed conductor sections without impairment of the function of the device according to the present invention.

The printed conductor sections acting as antennas form an open oscillating circuit, which oscillates at a predetermined frequency. According to an advantageous specific embodiment of the present invention, an analyzer circuit may also be provided on the circuit carrier in addition to the printed conductor sections. This circuit analyzes a change in the oscillation frequency of the oscillating circuit which is caused by the change in the inductance and determines the torque applied to the shaft and/or the rotational angle of the shaft as a function of the ascertained frequency change. The situating analyzer circuit on the circuit carrier contributes to both the cost reduction and also the minimization of installation space.

According to a further advantageous specific embodiment of the present invention, the circuit carrier and/or the transducer element are coated for protection from environmental influences.

DETAILED DESCRIPTION

Figure 1:
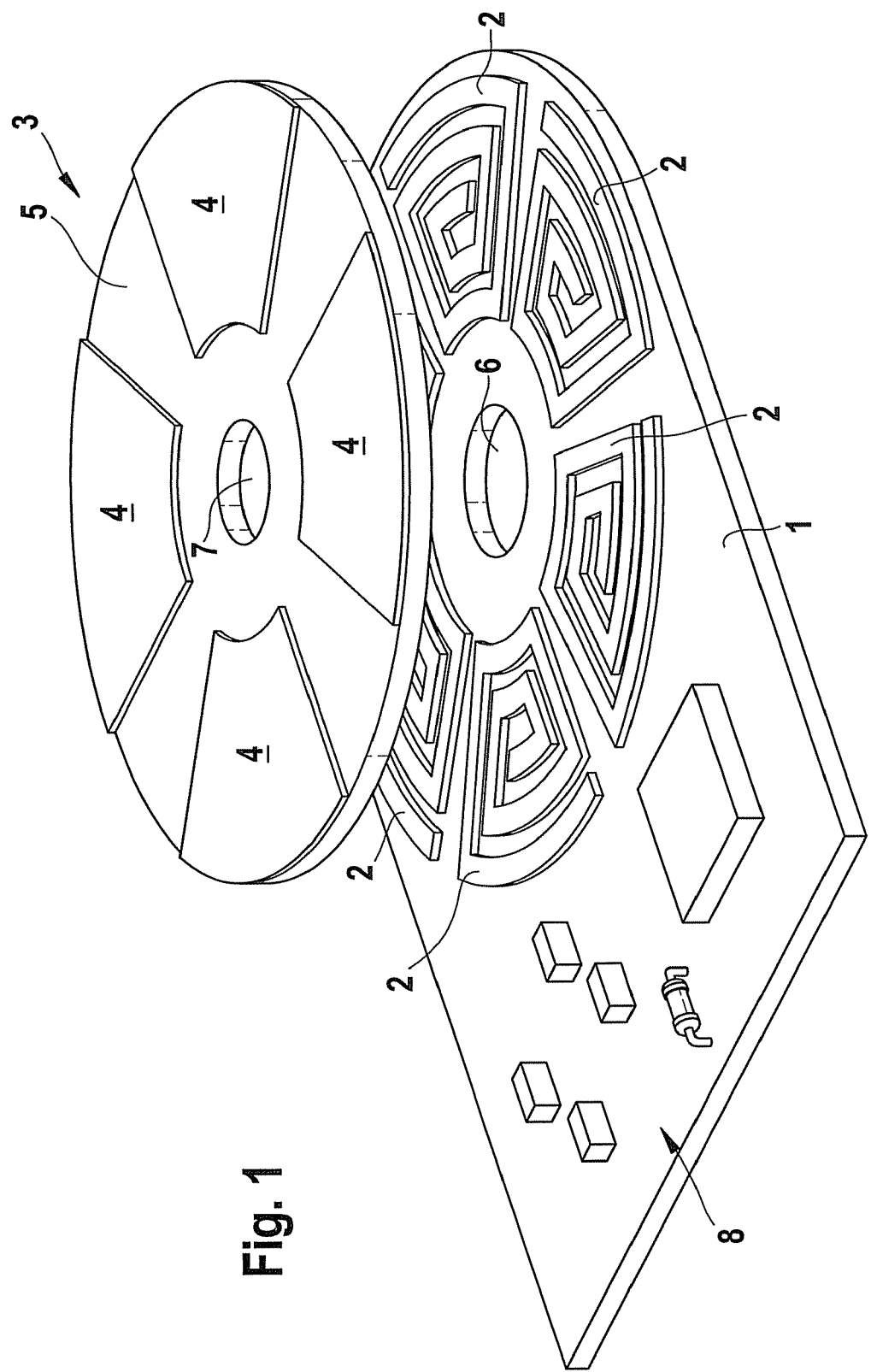
FIG. 1 shows a schematic perspective illustration of a first specific embodiment of the device according to the present invention for determining a torque and/or a rotational angle of a shaft.

In FIG. 1, a device according to the present invention for determining a torque and/or a rotational angle of a shaft (not shown) is shown in a schematic perspective view. Printed conductor sections 2 in the form of printed conductors arranged in spirals, which act as antennas, are situated on a circuit carrier 1. In the specific embodiment shown, a total of six printed conductor sections 2 are provided. However, it is sufficient for the functional capability of the device according to the present invention if at least two printed conductor sections 2 are provided. Fundamentally, 2*k printed conductor sections 2 with k=1, 2, 3 ... n are possible. The provision of more than two printed conductor sections 2 results in an increase of the resolution of the device according to the present invention and thus a more exact determination of the torque and/or the rotational angle of the shaft. In addition, the possibility results through the use of more than two printed conductor sections 2 of interconnecting printed conductor sections 2 into two groups, and thus producing a redundancy, which results in an increase in the reliability of the device according to the present invention.

A transducer element 3 has first subareas 4 made of electrically conductive material and second subareas 5 made of electrically nonconductive material. According to the specific embodiment shown in FIG. 1, four first subareas 4 made of electrically conductive material are provided, which are formed by metal surfaces, which are applied to transducer element 3, made of electrically nonconductive base material. The metal surfaces are distributed uniformly over transducer element 3 in the peripheral direction of the shaft, so that second subareas 5 made of electrically nonconductive material, which are required according to the present invention, arise between first subareas 4 formed by the metal surfaces in each case. The metal surfaces are preferably implemented as injection-molding-encapsulated metal inlay parts.

According to the specific embodiment shown, four first subareas 4 made of electrically conductive material and four second subareas 5 made of electrically nonconductive material are provided. However, it is sufficient for the function of the device according to the present invention for the transducer element to have at least one first subarea 4 made of electrically conductive material and one second subarea 5 made of electrically nonconductive material. An obvious possible increase of the number of the subareas results in turn in an increased resolution and thus a more precise determination of a torque and/or a rotational angle of the shaft.

Alternatively to the specific embodiment shown, transducer element 3 may also be made of an electrically conductive base material, such as metal, and second subarea 5, made of electrically nonconductive material, may be formed by simple cutouts or openings.

Both circuit carrier 1 and also transducer element 3 are situated concentrically to the shaft and are preferably implemented as disc-shaped, for example, in the form of a circular disk. The metal surfaces situated on transducer element 3 or the openings or cutouts provided in transducer element 3 are preferably distributed uniformly on transducer element 3 in the peripheral direction of the shaft. Printed conductor sections 2 which are situated on circuit carrier 1 are preferably also distributed uniformly over circuit carrier 1 in the peripheral direction of the shaft.

In order to achieve a rotation of transducer element 3 in relation to circuit carrier 1 upon application of a torque to the shaft, a torsion bar (not shown) is preferably used, which connects a first subarea of the shaft to the second subarea of the shaft and twists upon application of a torque to the shaft. At least circuit carrier 1 or transducer element 3 is fastened on the torsion bar. The particular other element may be fastened at a predetermined spacing to the first element on the torsion bar as well, on the shaft itself, or also on a rotationally fixed component situated in the area of the shaft, such as a housing part. While the fastening of both elements, i.e., circuit carrier 1 and transducer element 3, on the torsion bar or the shaft allows a determination of the torque, fastening of one component on a rotationally fixed component is used for determining the rotational angle of the shaft.

Circuit carrier 1 has an opening 6, which is preferably adapted to the external shape of the shaft or the torsion bar, and which is used for fastening circuit carrier 1 on the shaft or the torsion bar. Circuit carrier 1, which is produced from PCB or ceramic, for example, may either be fastened directly on the shaft or the torsion bar or, to increase the mechanical stability and/or to simplify the installation, may also be fastened with the aid of a sleeve (not shown) on the shaft or the torsion bar.

An opening 7, which is adapted in its external shape to the shaft (not shown) or the torsion bar, is also provided in transducer element 3, which is used for fastening transducer element 3 on the shaft or the torsion bar. Transducer element 3 may either be fastened directly on the shaft or the torsion bar or a sleeve may be used to increase the mechanical stability and/or to simplify the installation.

If circuit carrier 1 or transducer element 3 is not fastened on the shaft or the torsion bar, but rather on a rotationally fixed component, such as a housing part, corresponding opening 6 or 7 may be dispensed with and instead another suitable fastening device may be provided.

If a current is applied to printed conductor sections 2, which are situated on circuit carrier 1, these sections act as antennas, which are part of an open oscillating circuit, which oscillates at a predetermined frequency. If a torque is applied to the shaft, the relative position of transducer element 3 to circuit carrier 1 changes and the overlap area between printed conductor sections 2 and first subareas 4 of the transducer element, which are made of electrically conductive material, also changes. Because of self-induction, the inductance of printed conductor sections 2 thus also changes and therefore finally the oscillation frequency of the oscillating circuit changes. Upon maximum overlap of a printed conductor section 2 with a first subarea 4 made of electrically conductive material, the inductance of the oscillating circuit is lowest and the oscillating frequency is thus highest. The change in the oscillating frequency of the oscillating circuit thus represents a measure of the rotational angle or the applied torque on the shaft. This frequency change may be analyzed with the aid of an analyzer circuit 8 and a torque and/or a rotational angle of the shaft may be determined therefrom.

Analyzer circuit 8, which may be implemented by an ASIC and/or a discrete circuit, for example, is advantageously situated on circuit carrier 1 (FIG. 1). Analyzer circuit 8 may also be implemented as a separate component, of course.

According to the specific embodiment shown in FIG. 1, printed conductor sections 2 are implemented as spiral printed conductors, but in alternative specific embodiments, they may also be implemented by other planar printed conductor configurations. Printed conductor sections 2 are advantageously implemented so that they act as antennas, which generate a magnetic field, which is oriented so it is focused on transducer element 3 as much as possible. It is thus also advantageous if printed conductor sections 2 are implemented in regard to their radial extension as extensively congruent with the radial extension of first and second subsections 4 and 5 of transducer element 3.

Figure 2A:
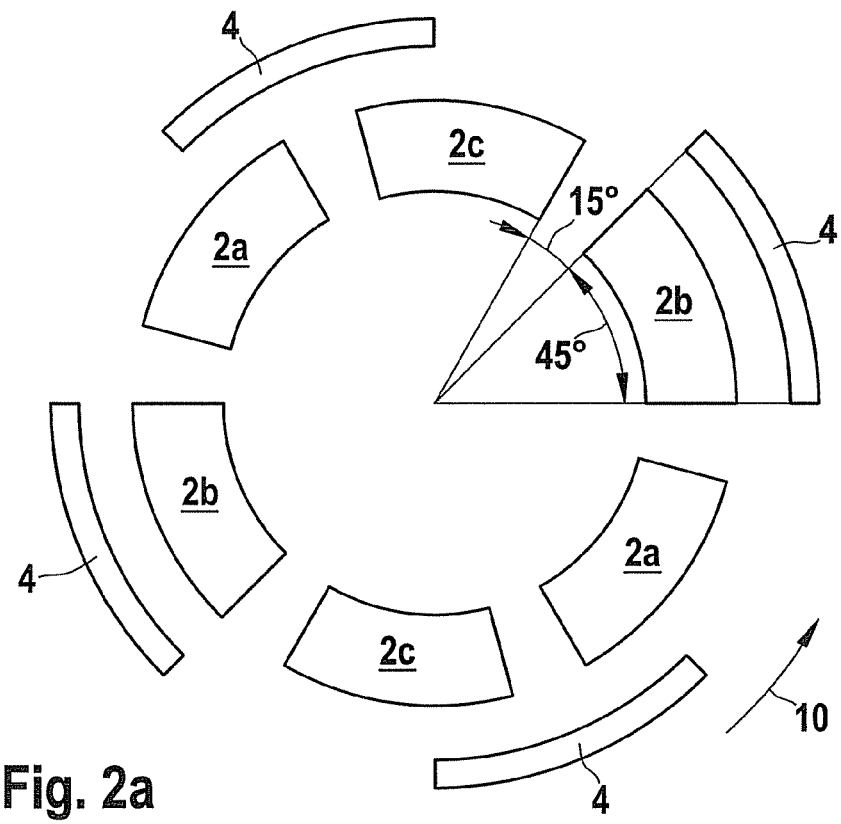
FIG. 2a shows a schematic illustration of the spatial configuration of the printed conductor sections in relation to the subareas of the transducer element in a specific embodiment of the present invention according to FIG. 1.

The spatial configuration of individual subsections 4 and 5 of transducer element 3 in relation to printed conductor sections 2a, 2b, and 2c in the specific embodiment of the present invention according to FIG. 1 is shown in FIG. 2a. It is to be noted here that this is solely a schematic illustration, which illustrates neither the real configuration of the individual elements nor their real implementation, but rather only shows the change in the overlap areas between printed conductor sections 2 and the first subareas of transducer element 3 as a function of the rotation angle.

According to the specific embodiment shown in FIG. 1, four first subareas 4 in the form of metal surfaces and six printed conductor sections 2a, 2b, and 2c, which are situated on circuit carrier 1, are provided on transducer element 3 (not shown in FIG. 2a), which are each only indicated in FIG. 2a by corresponding circular sectors. According to the illustration in FIG. 2a, circuit carrier 1 has a circular shape, printed conductor sections 2a, 2b, and 2c and first subareas 4 of transducer element 3 each covering a peripheral angle of 45° and being distributed uniformly over circuit carrier 1 or transducer element 3 in the peripheral direction. A spacing angle of 15° results in each case between two adjacent printed conductor sections 2.

Figure 2B:
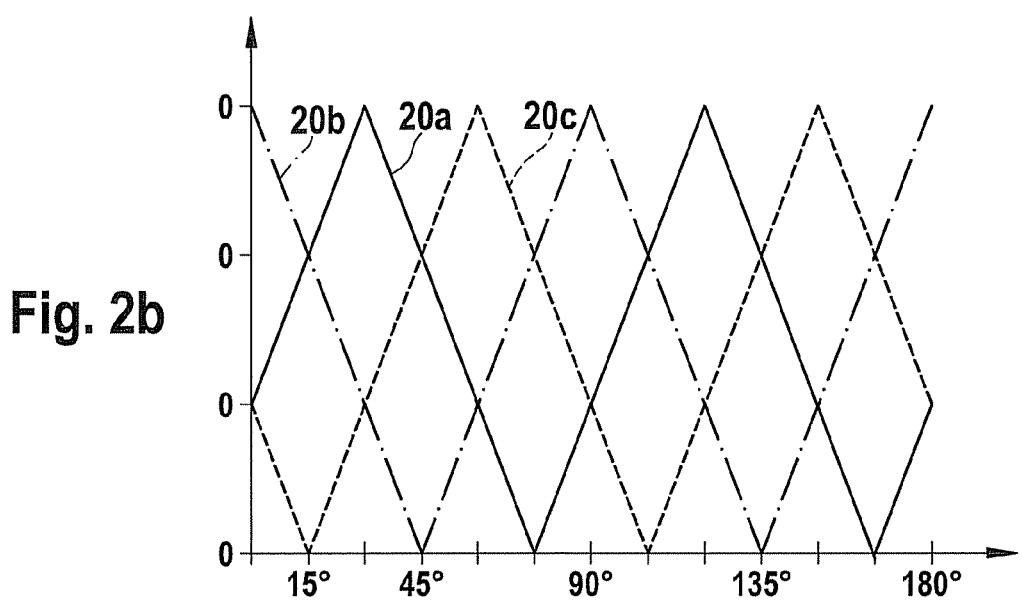
FIG. 2b shows a schematic characteristic curve to represent the overlap of the printed conductor sections and the first subareas made of electrically conductive material of the transducer element as a function of a rotation angle in a specific embodiment according to FIG. 1.

A schematic characteristic curve is shown in FIG. 2b, which illustrates a degree of the overlap between printed conductor sections 2a, 2b, and 2c and first subareas 4 of transducer element 3 as a function of the rotational angle of transducer element 3 in relation to circuit carrier 1. The characteristic curve for printed conductor sections 2a is designated by reference numeral 20a, the characteristic curve for printed conductor sections 2b by reference numeral 20b, and the characteristic curve for printed conductor sections 2c by reference numeral 20c. The assumed rotational direction of transducer element 3 and thus first subareas 4 is indicated in FIG. 2a by an arrow 10. Thus, for example, at a rotational angle of 0°, i.e., in the starting position shown in FIG. 2a, an overlap of 1 results for printed conductor sections 2b, i.e., a complete overlap. In contrast, printed conductor sections 2a and 2c only have an overlap of ⅓, i.e., 15°. At a rotational angle of 75°, for example, an overlap of ⅔ results for printed conductor sections 2b and 2c, while in contrast printed conductor sections 2a have no overlap.

Figure 3:
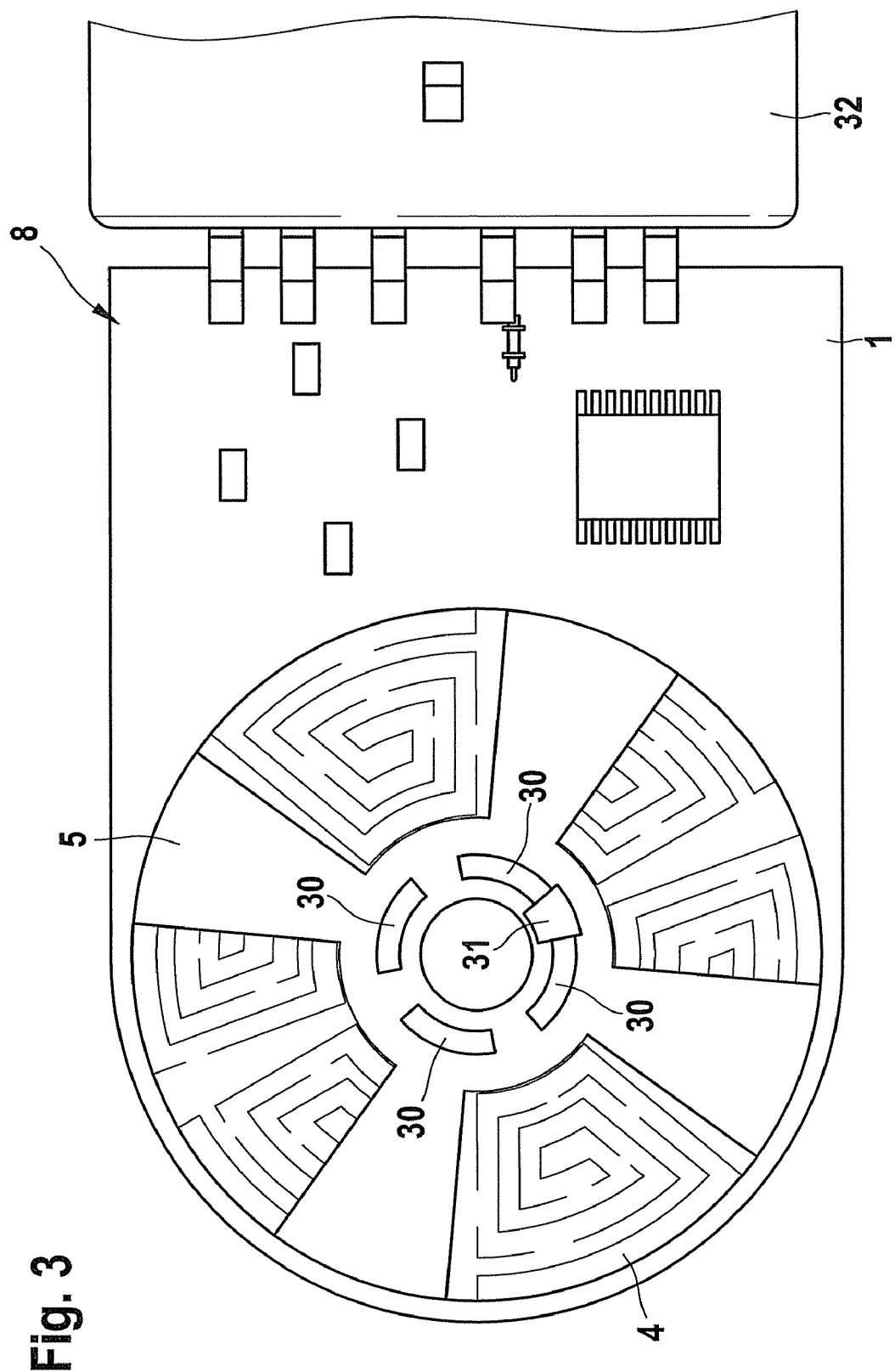
FIG. 3 shows a schematic top view of a second specific embodiment of the device according to the present invention.

A top view of a device according to the present invention according to a second specific embodiment is shown in FIG. 3. Transducer element 3 is shown as slightly transparent, so that the part of circuit carrier 1 lying underneath is also recognizable. In addition to printed conductor sections 2, further printed conductor structures 30 are provided on the circuit carrier, which also act as antennas, and an additional metal surface is provided on transducer element 3, which forms a further subarea 31 of transducer element 3 made of electrically conductive material. Further printed conductor structures 30 and further subarea 31 fundamentally operate according to the same principle as printed conductor sections 2 in interaction with first subareas 4. It is also sufficient to provide at least two further printed conductor sections 30 on circuit carrier 1 and at least one further subarea 31 made of electrically conductive material and one further subarea made of electrically nonconductive material on the transducer element. For example, with the aid of further printed conductor structures 30 and the further subareas of transducer element 3, an index function may be implemented, which may be used for the plausibility check of the torque and/or rotational angle value determined with the aid of printed conductor sections 2.

An index function of this type acquires particular significance for the case in which the device is designed redundantly. Redundant means that, of the 2*k printed conductor sections acting as antennas, k printed conductor sections, i.e., half of them, are each used for determining the torque and/or the rotational angle of the shaft. In this way, two independent redundant signals are obtained, which contributes to increasing the reliability and thus the security of the device. In various applications, redundancy is also absolutely required, which is to be implemented cost-effectively in this manner. However, the measuring range is halved from 360° to 180° by this procedure.

This reduction of the measuring range may also be compensated for by further printed conductor structures 30, which also act as antennas, because it may be ascertained with the aid of these structures in which subarea the value of the rotational angle must lie. If, as shown in FIG. 3, four further printed conductor structures 30 are provided, an index function results therefrom, which divides the measuring range into four subsections from 0° to 90°, 90° to 180°, 180° to 270°, and 270° to 360°. With only two printed conductor structures 30, a division into two subareas from 0° to 180° and 180° to 360° would result correspondingly.

If the device according to the present invention is used for determining the rotational angle of a shaft, i.e., circuit carrier 1 or transducer element 3 is fastened on a rotationally-fixed component situated in the area of the shaft, rotational angles of 360° and more may also occur. The index function may also be advantageously employed by using it as a type of counter, which shows the number of the revolutions.

In addition, a plug 32 is provided in FIG. 3, via which printed conductor sections 2 and/or structures 30 and/or analyzer circuit 8 are electrically contacted. A plug 32 of this type is usable for contacting the individual components independently of the concrete specific embodiment of the device according to the present invention, of course.

Both circuit carrier 1 and also transducer element 3 are advantageously housed in a common housing. The components may be partially or completely coated, e.g., with the aid of lacquer or polymer coatings, for protection from environmental influences.

The device according to the present invention is capable in particular of determining a torque and/or a rotational angle of a steering column in a motor vehicle.

What is claimed is:

1. A device for determining at least one of a torque and a rotational angle of a shaft, comprising:
   a circuit carrier, which is concentric to the shaft, and on which is situated at least two electrically connected printed conductor sections conducting a same current; and
   a transducer element, which is concentric to the shaft and is rotatable in relation to the circuit carrier, having at least one first subarea made of electrically conductive material and at least one second subarea made of electrically nonconductive material,
   wherein, upon application of a torque to the shaft, the transducer element rotates in relation to the circuit carrier, wherein an overlap area between the printed conductor sections and the first subarea of the transducer element changes and a change in an inductance of the printed conductor sections occurs.

2. The device according to claim 1, wherein the circuit carrier and the transducer element have a disk-shaped design.

3. The device according to claim 1, wherein the transducer element is made of electrically conductive base material and cutouts in the form of sectors or segments are provided, which form the second subarea and are distributed uniformly over the transducer element in a peripheral direction of the shaft.

4. The device according to claim 1, wherein the transducer element is made of electrically nonconductive base material and metal surfaces in the form of sectors or segments are provided, which form the first subarea and are preferably distributed uniformly over the transducer element in a peripheral direction of the shaft.

5. The device according to claim 4, wherein the metal surfaces are injection-molding-encapsulated metal inlay parts.

6. The device according to claim 1, wherein the printed conductor sections are formed by printed conductors arranged in spirals on the circuit carrier, which are distributed uniformly over the circuit carrier in a peripheral direction of the shaft.

7. The device according to claim 1, further comprising an analyzer circuit situated on the circuit carrier, for analyzing a change, which is caused by the change in the inductance, in an oscillation frequency of an oscillating circuit formed from the printed conductor sections.

8. The device according to claim 1, wherein the circuit carrier and the transducer element are housed in a common housing and the printed conductor sections are electrically contacted via a plug.

9. The device according to claim 1, wherein at least one of the circuit carrier and the transducer element is coated for protection from environmental influences.

10. The device of claim 1, wherein the circuit carrier further comprises a plurality of printed conductor section groups, each printed conductor group including at least two electrically connected printed conductor sections.

11. The device of claim 10, wherein the printed conductor section groups are arranged to produce a measured signal redundancy.

12. The device of claim 1, wherein each printed conductor section is implemented as a spiral printed conductor.

* * * * *